United States Patent
Wang et al.

(10) Patent No.: US 9,176,875 B2
(45) Date of Patent: *Nov. 3, 2015

(54) POWER GATING A PORTION OF A CACHE MEMORY

(71) Applicant: Intel Corporation, Santa Clara, CA (US)

(72) Inventors: Ren Wang, Portland, OR (US); Ahmad Samih, Beaverton, OR (US); Eric Delano, Fort Collins, CO (US); Pinkesh J. Shah, Chandler, AZ (US); Zeshan A. Chishti, Hillsboro, OR (US); Christian Maciocco, Portland, OR (US); Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/785,228

(22) Filed: Mar. 5, 2013

(65) Prior Publication Data

US 2014/0173206 A1 Jun. 19, 2014

Related U.S. Application Data

(63) Continuation of application No. 13/715,613, filed on Dec. 14, 2012.

(51) Int. Cl.
*G06F 1/32* (2006.01)
*G06F 12/08* (2006.01)

(52) U.S. Cl.
CPC ............. *G06F 12/0802* (2013.01); *G06F 1/32* (2013.01); *G06F 1/3287* (2013.01); *G06F 12/0811* (2013.01); *G06F 1/3215* (2013.01); *G06F 2212/1028* (2013.01)

(58) Field of Classification Search
CPC ....... G06F 1/32; G06F 1/3234; G06F 1/3287; G06F 1/3215; G06F 12/0811; G06F 12/0802; G06F 2212/1028
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003
EP 2336892 6/2011
WO 2012136766 10/2012

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Cheng-Yuan Tseng
*Assistant Examiner* — Rocio Del Mar Perez-Velez
(74) *Attorney, Agent, or Firm* — Trop, Pruner & Hu, P.C.

(57) ABSTRACT

In an embodiment, a processor includes multiple tiles, each including a core and a tile cache hierarchy. This tile cache hierarchy includes a first level cache, a mid-level cache (MLC) and a last level cache (LLC), and each of these caches is private to the tile. A controller coupled to the tiles includes a cache power control logic to receive utilization information regarding the core and the tile cache hierarchy of a tile and to cause the LLC of the tile to be independently power gated, based at least in part on this information. Other embodiments are described and claimed.

17 Claims, 7 Drawing Sheets

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,596,662 B2 * | 9/2009 | Makineni et al. | 711/122 |
| 7,730,340 B2 | 6/2010 | Hu et al. | |
| 8,738,860 B1 * | 5/2014 | Griffin et al. | 711/122 |
| 8,799,624 B1 * | 8/2014 | Griffin et al. | 712/29 |
| 2001/0044909 A1 | 11/2001 | Oh et al. | |
| 2002/0147957 A1 * | 10/2002 | Matsui et al. | 716/11 |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0114850 A1 * | 5/2005 | Chheda et al. | 717/151 |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0150658 A1 * | 6/2007 | Moses et al. | 711/130 |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0059707 A1 * | 3/2008 | Makineni et al. | 711/122 |
| 2008/0250260 A1 | 10/2008 | Tomita | |
| 2008/0307240 A1 * | 12/2008 | Dahan et al. | 713/320 |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0327609 A1 * | 12/2009 | Fleming et al. | 711/118 |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0250856 A1 * | 9/2010 | Owen et al. | 711/128 |
| 2011/0154090 A1 | 6/2011 | Dixon et al. | |
| 2011/0161627 A1 * | 6/2011 | Song et al. | 711/104 |
| 2011/0219190 A1 | 9/2011 | Ng et al. | |
| 2012/0079290 A1 | 3/2012 | Kumar | |
| 2012/0131370 A1 | 5/2012 | Wang et al. | |
| 2012/0166731 A1 | 6/2012 | Maciocco et al. | |
| 2012/0210032 A1 | 8/2012 | Wang et al. | |
| 2012/0233377 A1 * | 9/2012 | Nomura et al. | 711/3 |
| 2012/0246506 A1 | 9/2012 | Knight | |
| 2012/0254643 A1 | 10/2012 | Fetzer et al. | |
| 2013/0080813 A1 * | 3/2013 | Tarui et al. | 713/324 |
| 2013/0111121 A1 * | 5/2013 | Ananthakrishnan et al. | 711/105 |
| 2014/0040676 A1 * | 2/2014 | Solihin | 711/141 |
| 2014/0181410 A1 * | 6/2014 | Kalamatianos et al. | 711/133 |
| 2014/0223104 A1 * | 8/2014 | Solihin | 711/135 |
| 2014/0237185 A1 * | 8/2014 | Solihin | 711/119 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

Intel Corporation, "Intel Core 2 Due Mobile Processor, Intel Core 2 Solo Mobile Processor and Intel Core 2 Extreme Mobile Processor on 45-nm Process," Chaper 2, Low Power Features, May 2009, 15 pages.

International Searching Authority, "Notification of Transmittal of the International Search Report and the Written Opinion of the International Searching Authority," mailed Oct. 24, 2013, in International application No. PCT/US2013/048486.

* cited by examiner

POWER GATING A PORTION OF A CACHE MEMORY

This application is a continuation of U.S. patent application Ser. No. 13/715,613, filed Dec. 14, 2012, the content of which is hereby incorporated by reference.

BACKGROUND

Processor power dissipation has become an issue for processors of all types, from low end mobile processers to high end server processors. Among processor components, a cache memory is a major portion of a processor's area and transistor counts, and consumes significant leakage power. For example, for a typical commercially available multicore processor, 40% of total leakage power is due to a last level cache (LLC) and interconnect.

While reducing a cache's leakage power by turning off portions of a cache memory may reduce processor power consumption, it is practically difficult to turn off even portions of a LLC as it is typically implemented as a shared memory structure in which a portion of all memory addresses of a system is statically mapped to each LLC portion. As such, even if one core of a multicore processor is operating, all LLC slices are active to service memory requests mapped to the slices. And thus there are limited power saving opportunities for a cache memory in current processors.

DETAILED DESCRIPTION

In various embodiments, a multicore processor such as a multi-tile chip multiprocessor (CMP) may be provided with a multi-level cache memory hierarchy. In this hierarchy each of the levels of cache memory may be arranged as private portions each associated with a given core or other caching agent. In this way, a private cache organization is realized to allow embodiments to enable local LLC portions or slices associated with a caching agent to be dynamically power gated in certain circumstances. As will be described herein, this dynamic power gating of an LLC slice may occur when at least one of the following situations is present: (i) the associated core is in a low power state (such as a given sleep state); and (ii) a lower cache level in the hierarchy (e.g., a mid-level cache (MLC)) provides sufficient capacity for execution of an application or other workload running on the core. In this way, total chip power may be significantly reduced. Although the embodiments described herein are with regard to power gating of a LLC, understand that in other embodiments a different level of a multi-level cache hierarchy can be power gated.

Figure 1:
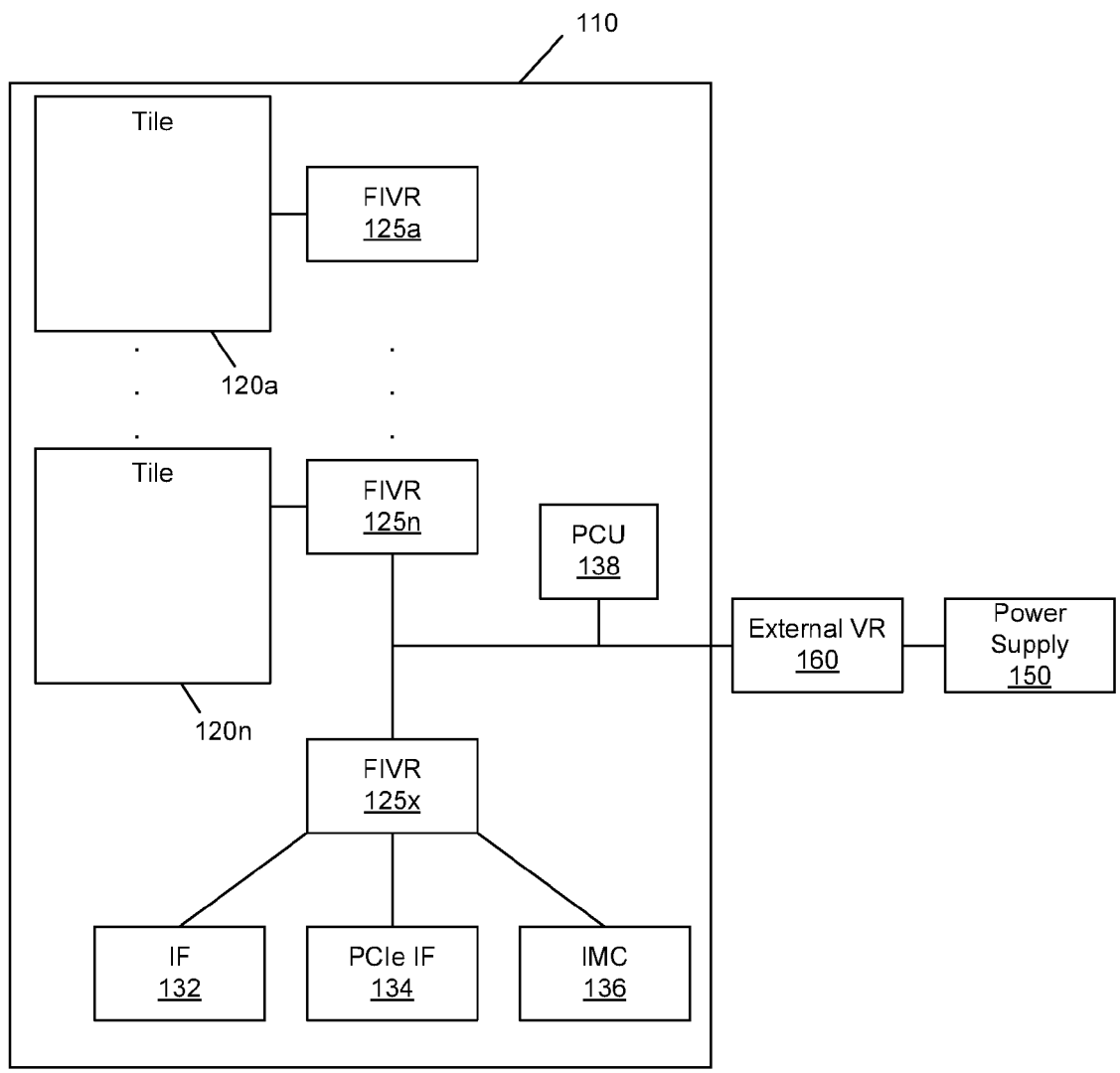
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple tiles $120_a$-$120_n$. Each tile includes a processor core and an associated private cache memory hierarchy that, in some embodiments is a three-level hierarchy with a low level cache, a MLC and an LLC. In addition, each tile may be associated with an individual voltage regulator $125_a$-$125_n$. Accordingly, a fully integrated voltage regulator (FIVR) implementation may be provided to allow for fine-grained control of voltage and thus power and performance of each individual tile. As such, each tile can operate at an independent voltage and frequency, enabling great flexibility and affording wide opportunities for balancing power consumption with performance. Of course, embodiments apply equally to a processor package not having integrated voltage regulators.

Still referring to FIG. 1, additional components may be present within the processor including an input/output interface 132, another interface 134, and an integrated memory controller 136. As seen, each of these components may be powered by another integrated voltage regulator $125x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform adaptive local LLC power control in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

While not shown for ease of illustration, understand that additional components may be present within processor 100 such as uncore logic, and other components such as internal memories, e.g., an embedded dynamic random access memory (eDRAM), and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the power savings realized by local LLC power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). When all cores of a multicore processor are in a core low power state, the processor can be placed in a package low power state, such as a package C6 low power state. This package low power state is a deeper low power state than a core C6 state, since additional processor circuitry can be turned off such as certain clock generation circuitry including phase locked loops (PLLs).

Figure 2:
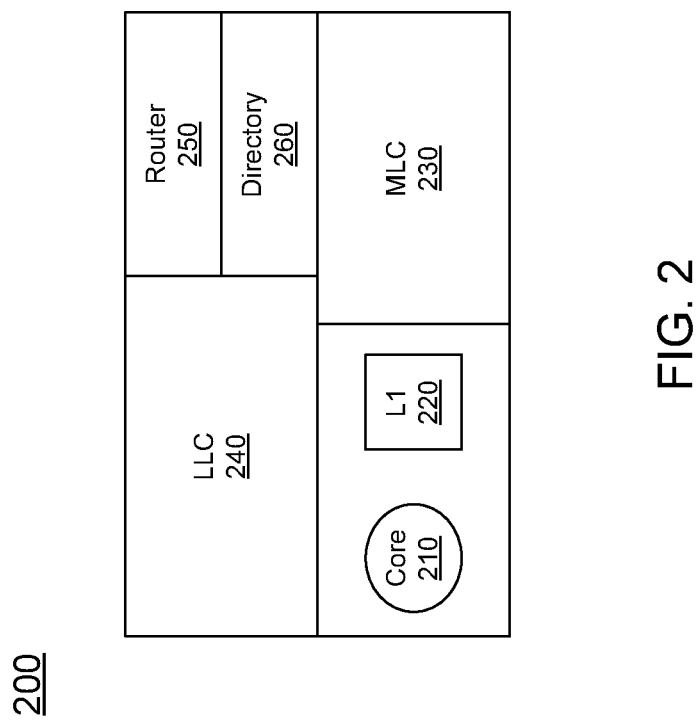
FIG. 2 is a block diagram of a tile of a multi-tile chip multiprocessor in accordance with an embodiment of the present invention.

Referring now to FIG. 2, shown is a block diagram of a tile of a multi-tile CMP in accordance with an embodiment of the present invention. As shown in FIG. 2, tile 200 includes various components that may be replicated across each tile of the CMP to provide multi-processing capabilities. In the embodiment of FIG. 2, tile 200 includes a core 210 which in different embodiments may be an in-order core or an out-or-order core. In one embodiment, core 210 may have a microarchitecture including processor logic and circuits used to implement an instruction set architecture (ISA). Accordingly, processors with different micro-architectures can share at least a portion of a common instruction set. For example, Intel® Pentium 4 processors, Intel® Core™, and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

Core 210 may couple to a first level cache 220 that may be a relatively small cache memory closely associated with the core. In turn, cache 220 is coupled to a mid-level cache (MLC) 230 that may include greater storage capacity. In turn, MLC 230 is coupled to a further portion of a cache hierarchy, namely a last level cache (LLC) 240 that may include even greater amounts of storage capacity. In some embodiments, this cache hierarchy formed of cache 220, MLC 230, and LLC 240 may be an inclusive cache hierarchy such that all of the information stored in cache 220 is present in cache 230, and all of the information stored in cache 230 is present in LLC 240. Of course, when LLC 240 is power gated when the core is active, the hierarchy is non-inclusive.

Also understand that this tile-included cache hierarchy includes slices or portions of a shared cache implemented with LLC 240 of a larger cache memory structure. In other words, the LLC may be a portion of a larger cache structure of the level distributed access the tiles. In addition, tile 200 includes a router 250 and a directory 260. In general, router 250 may be used to route communications to and from other components of the CMP such as one or more other tiles and/or other agents of the processor. In turn, directory 260 may be part of a distributed directory protocol to enable cache coherent operation within the system. Although shown at this high level in the embodiment of FIG. 2, understand the scope of the present invention is not limited in this regard. For example, while FIG. 2 shows a three-level cache hierarchy understand the scope of the present invention is not limited in this regard, and in different embodiments a two-level cache hierarchy (or a hierarchy having greater than three levels) may be provided. Also, while embodiments described herein are with regard to power control of a LLC, in an implementation having a different number of levels instead another cache level may be controlled as described herein.

Figure 3:
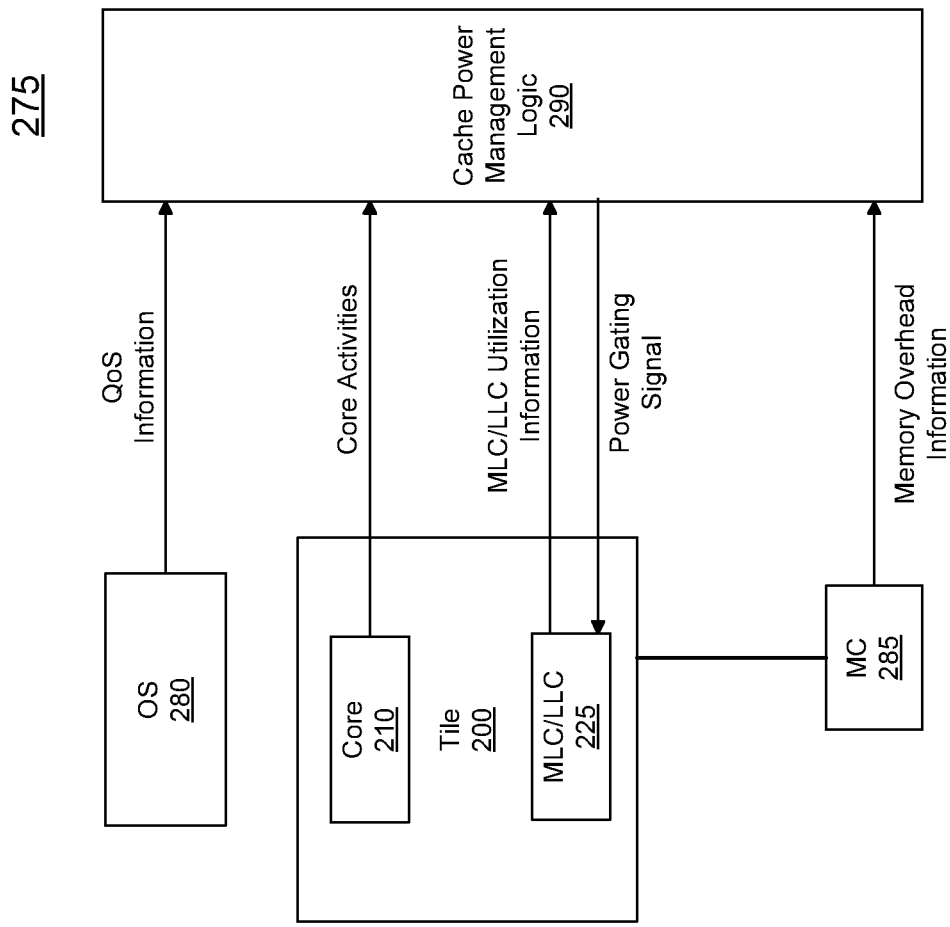
FIG. 3 is a high level architecture block diagram of components involved in performing adaptive local cache power management in accordance with an embodiment of the present invention.

Referring now to FIG. 3, shown is a high level architecture block diagram of components involved in performing adaptive local cache power management in accordance with an embodiment of the present invention. As shown in FIG. 3, circuit 275 includes various components that provide information regarding processor activities to a cache power management logic 290 that in turn generates a decision as to power control of an LLC. In an embodiment, logic 290 may be of a PCU of the processor, or it may be an independent control logic. As seen, a tile 200 includes a core 210 and a cache hierarchy 225 including an MLC and an LLC. Note that the low level cache of the cache hierarchy may be included as part of core 210. In addition, understand that the MLC and LLC may be separate such that responsive to the various inputs received, logic 290 can send a decision to cause the LLC portion of the cache hierarchy to be power gated, based on performance metrics and other conditions.

As further seen in FIG. 3, an OS 280 provides QoS information to logic 290. Also, a memory controller 285, which may be an integrated memory controller of a processor package provides certain information, including memory overhead information, details of which will be discussed further below. Logic 290 also receives various performance metric information from tile 200. This information can include core activity information received from core 210 and utilization information regarding the cache hierarchy, including miss information from the MLC. Based on all this information, logic 290 may make a control decision with regard to the LLC and provide that decision to cache hierarchy 225.

If the decision is to power gate the LLC, the information stored in the LLC can be flushed, e.g., to another cache hierarchy of another tile, another storage within the processor package such as an eDRAM or other internal storage. Or the information can be flushed to a system memory, via memory controller 285. Although shown at this high level in the embodiment of FIG. 3, understand the scope of the present invention is not limited in this regard.

Note that embodiments also apply to other processor architectures such as a clustered cache organization, e.g., a cluster on die, where the unit of LLC power management is a cluster of LLC slices instead of one individual LLC slice. Throughout this discussion, the terms "core" and "a cluster of cores" are used interchangeably.

To determine whether power savings via LLC power gating are possible, embodiments may continuously monitor core activity and cache behavior to detect certain scenarios. In an embodiment, two different scenarios may be detected. First, when a core is to be placed into a certain low power state (e.g., entering a C6 state), potentially its LLC can be flushed and turned off to save power. To determine whether a power savings is possible, one or more run-time conditions such as certain performance metrics may be analyzed to make an intelligent decision on whether an upcoming idle duration can amortize the cost of flushing and turning off the LLC slice. Second, for a core that is in an active state, other performance metrics can be analyzed such as misses being sent out of a MLC. If the number of misses generated by the MLC within a period of time is less than a threshold, the LLC may be flushed and power gated, as this is an indication that the MLC has sufficient cache capacity to handle a given workload.

In an embodiment, the run-time conditions to be analyzed include the workload characteristics, number of ways that are enabled, misses of the MLC per thousand instructions (mpki), and upcoming idle duration estimation. In some embodiments, quality of service (QoS) requirements of an OS/application also may be considered, since power gating the LLC introduces a longer resume latency (e.g., due to loading the data from system memory). Note that in some embodiments, this delay can be mitigated by storing data in other underutilized LLC slices or in another memory such as an eDRAM.

Embodiments may make a determination as to whether to flush and power gate a LLC slice when a core enters a low power state since flushing/reloading cache contents and entering/exiting a given low power state have certain overhead associated with the actions. Thus, it can be determined whether the LLC slice is to stay in the low power state for at least a minimum amount of time, referred to herein as an energy break even time (EBET), to compensate for the energy overhead for the transitions (in and out). Moreover, flushing a cache slice and entering a low power state may also create a small amount of delay when the core wakes up, and thus may impact responsiveness and performance. As such, embodiments may only flush and turn off a LLC slice when the expected idle duration is long enough to amortize the overhead (as measured by the EBET), and also when a certain performance level is maintained.

Further, if the core is running, the MLC might offer sufficient cache capacity for a short period of time until the application changes its behavior. Hence, this application behavior may also be detected such that the LLC is only flushed if the MLC provides enough capacity and a workload's memory needs are relatively stable, to prevent oscillation.

In an embodiment, EBET is defined as the minimum time for the LLC to transition into and remain in a given lower power state (including the entry and exit transition time), to compensate for the cost of entering and exiting this state from a powered on state. According to an embodiment, this EBET is based both on static and dynamic conditions, including resume and exit latency, power consumption during on, transition and off states, and dynamic run-time conditions, such as cache size used. For example, when an opened cache size is very small, the overhead of flushing and reloading the data is typically small, thus reducing the total overhead.

In one embodiment, the following factors may be considered in determining an adaptive EBET value: (1) enter and exit latency (L); (2) power during enter and exit period ($P_t$); (3) LLC on power ($P_m$), and LLC leakage power ($P_{off}$) when the LLC is power gated; (4) core power $P_c$ during reloading time, and memory related power $P_m$ during flushing and reloading time; and (5) content flushing overhead $O_f$ and content reloading overhead $O_r$, including system memory access overhead, e.g., as obtained from a memory controller. This total overhead is $O=O_f+O_r$.

Flushing and reloading cache content take time, introducing overhead. How long it takes, however, depends on the workload characteristic. And the energy consumption overhead also depends on system characteristics such as memory and memory controller power consumption. The first 4 factors are design parameters that may be stored in a configuration storage of the processor, while the fifth factor depends on run time dynamics. If a given workload consumes only a small number of cache ways, the flush time and reload time will be small as well. Moreover, for a workload that does not reuse data frequently (such as a streaming application), the cache flushing and reloading cost is relatively low since new data will be loaded anyway, regardless of flushing or not. This workload determination can be measured, in an embodiment, using LLC miss rate. If the miss rate is high, the application exhibits a streaming characteristic.

After the overhead O is determined, the EBET can be calculated as follows:

$$EBET*P_{on}=O*P_{on}+L*P_t+(EBET-O-L)*P_{off}+P_c*O_r+P_m*O.$$

And it yields:

$$EBET=(O*P_{on}+P_c*O_r+P_m*O+L*P_t-(O-L)*P_{off})/(P_{on}-P_{off}).$$

In order to simplify the design, $O_f$ and $O_r$ can be replaced by a design parameter to represent the average flushing and reloading overhead. Note that an EBET value can be updated periodically and dynamically based on the workload characteristics. If the workload behavior is stable, the EBET can be updated less frequently to reduce calculation overhead; otherwise the EBET can be updated more frequently. As an example, for a relatively stable workload, the EBET value can be updated approximately every several minutes. Instead with a dynamically changing workload, the EBET value can be updated approximately every several seconds or even less.

After the break even time EBET is determined, a length of the upcoming idle duration may be compared with the EBET value to determine whether it saves energy to flush and shut down the LLC slice. QoS factors may be considered in this analysis, in an embodiment.

There are multiple techniques to obtain an estimate of the upcoming idle duration. One exemplary technique includes an auto demotion method in which a controller observes a few idle durations in the near past. If these durations are smaller than the adaptive EBET when the LLC was flushed, then the controller automatically demotes the processor to a low power state (such as a core C4 state) in which the cache is not power gated.

Another exemplary technique to estimate upcoming idle duration includes using one or more device idle duration reports and other heuristics. These device idle duration reports may be received from devices coupled to the processor such as one or more peripheral or IO devices. Based on this information and heuristic information, the next idle duration can be predicted, e.g., by a control logic. Or a control logic can predict the idle duration based on a recent history of instances of idle durations such as via a moving filter that tracks the trend and provides a reasonable estimation of the idle duration.

A still further exemplary technique for power management is to power gate a LLC based on a measurement of MLC utilization to determine whether the LLC is needed or not. That is, if the MLC fulfills a workload's memory needs, the number of misses generated for a given number of instructions should be very little. Hence, in order to measure MLC performance, a metric can be monitored, such as the number of misses in the MLC per thousand instructions (mpki), which can be obtained from one or more counters associated with the LLC. If this metric (or another appropriate metric) is consistently below a given threshold (e.g., a th_mpki) for an evaluation period of time that is more than the EBET, then a determination may be made to flush and power gate the LLC. Note that this threshold may be a value above zero. That is, even if MLC is generating misses, but the misses are generated at a very slow pace, it may be more beneficial to power gate the LLC and let those misses be serviced by a further portion of a memory hierarchy instead of keeping the LLC consuming on and leakage power to service such a slow request rate. In some embodiments, this threshold (th_mpki) may depend on the LLC leakage and the dynamic power difference between fetching data from the LLC as compared to fetching data from memory.

Next, a decision may be made as to whether an LLC slice should be power gated when an associated core or cluster of cores enters into a given low power state. Independently, MLC utilization may be monitored to determine whether the LLC can be power gated even when the core is running.

In an embodiment, QoS information may be considered to prevent too frequent deep low power entries to avoid a performance impact. QoS information can be conveyed in different manners. For example, the QoS information may indicate whether the processor is allowed to enter a given low power state and/or by a QoS budget that defines how many deep low power state entries can take place in a unit of time. In another embodiment, QoS information can also be obtained from an energy performance bias value to indicate a high level direction on what type of performance/power balance a user is expecting.

Figure 4:
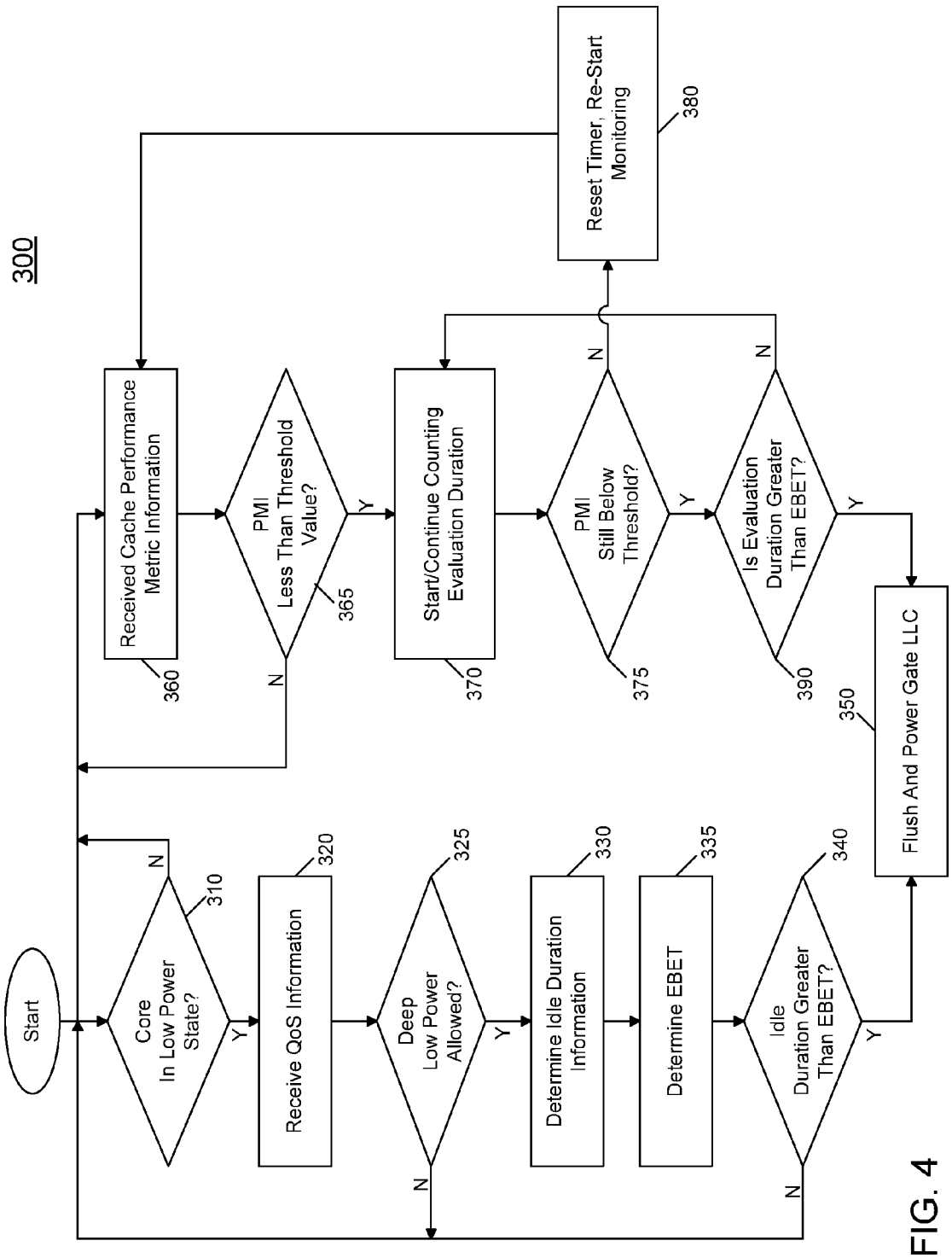
FIG. 4 is a flow diagram of a method in accordance with an embodiment of the present invention.

Referring now to FIG. 4, shown is a flow diagram of a method in accordance with an embodiment of the present invention. More specifically, method 300 can be performed by various logic of a processor. As an example, at least portions of method 300 can be performed by logic of a PCU. In addition, performance monitors of a processor can further be involved in the operations performed in FIG. 4. Note that although shown as a combined method in FIG. 4 understand that in other implementations the left and right branches of method 300 may be independently performed. For example, the left branch of method 300 may be performed upon seeking entry into a deep low power state, while the right branch of method 300 may be performed during performance monitoring activities to determine whether power savings are possible during normal processor operation. Furthermore, understand that the entities that perform these different branches of method 300 may be different in some embodiments. For example, logic of a PCU may perform the operations in the left branch of method 300, while a performance monitor or other processor logic may perform the right branch operations.

As shown in FIG. 4, operations of the left branch of method 300 begin by determining whether a core or cluster of cores is entering into a deep low power state which in an embodiment may be a core C6 state (block 310). If so, control passes to block 320 where QoS information may be received. Although the scope of the present invention is not limited in this regard in an embodiment this QoS information, which may correspond to a relative priority of a workload, can be obtained from an OS or application interface. Next, control passes to diamond 325 where it can be determined whether a deeper low power state is allowed. As an example, this deeper low power state may be a core deep C6 state. If this state is not allowed, the analysis with regard to the left branch of method 300 may conclude. Otherwise if this deeper low power state is to be allowed, control passes to block 330 where idle duration information may be determined. As discussed above, this information may be determined in various manners.

Next control passes to block 335 where the EBET may be determined. Although in some embodiments this value may be dynamically calculated, it is also possible to use a cached value of this EBET for performing the analysis. As an example, a fixed EBET may be stored in a configuration storage, or a cached EBET previously calculated by the logic can be accessed.

Still referring to FIG. 4, next at diamond 340 it can be determined whether this idle duration that was obtained is greater than the EBET value. If not, no further action is taken with regard to control of the cache memory and the tile may be maintained in a given low power state, e.g., in a C6 state. Otherwise if it is determined that the idle duration is greater than the EBET value, control passes to block 330 where the LLC may be flushed and power gated to thus reduce power consumption even further. Although the scope of the present invention is not limited in this regard in an embodiment this flushing and power gating may include performing an operation to write all dirty data from the LLC to a higher level of a memory hierarchy, e.g., system memory. After this, the LLC can be power gated to thus reduce power consumption.

Referring now to the right branch of method 300, it may begin at block 360 by receiving performance metric information of a cache, e.g., of a MLC. Although the scope of the present invention is not limited in this regard, one performance metric that may be monitored is a miss rate which in an embodiment may be measured as an mpki value. Next control passes to diamond 365 to determine whether this miss rate is less than a threshold value. In an embodiment this threshold may correspond to a threshold value of misses that indicates relatively low utilization of an LLC coupled to the MLC. If this miss value is less than this threshold value, control passes to block 370 where a counting of an evaluation duration may be performed, either from an initial value or continuing of the evaluation duration for which the miss rate is below this threshold. In an embodiment this evaluation duration is greater than the EBET value.

Next control passes to diamond 375 to determine whether the performance metric information (e.g., miss rate) remains below this threshold. If not, the timer can be reset and monitoring may begin again at block 360.

Otherwise if at diamond 375 it is determined that the miss rate remains below the threshold level, control passes to diamond 390 where it can be determined whether the evaluation duration is greater than the EBET value. If not, control proceeds back to block 370 for further counting of an evaluation duration. If instead it is determined that the evaluation duration is greater than the EBET value, control passes to block 350, discussed above, where the LLC may be flushed and power gated. Although shown at this high level in the embodiment of FIG. 4, understand the scope of the present invention is not limited in this regard.

As more computer systems are used in Internet, text, and multimedia applications, additional processor support has been introduced over time. In one embodiment, an instruction set architecture (ISA) may be associated with one or more computer architectures, including data types, instructions, register architecture, addressing modes, memory architecture, interrupt and exception handling, and external input and output (I/O).

In one embodiment, the ISA may be implemented by one or more micro-architectures, which include processor logic and circuits used to implement one or more instruction sets. Accordingly, processors with different micro-architectures can share at least a portion of a common instruction set. For example, Intel® Pentium 4 processors, Intel® Core™ and Intel® Atom™ processors from Intel Corp. of Santa Clara, Calif., and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a register alias table (RAT), a reorder buffer (ROB) and a retirement register file). In one embodiment, registers may include one or more registers, register architectures, register files, or other register sets that may or may not be addressable by a software programmer.

Figure 5:
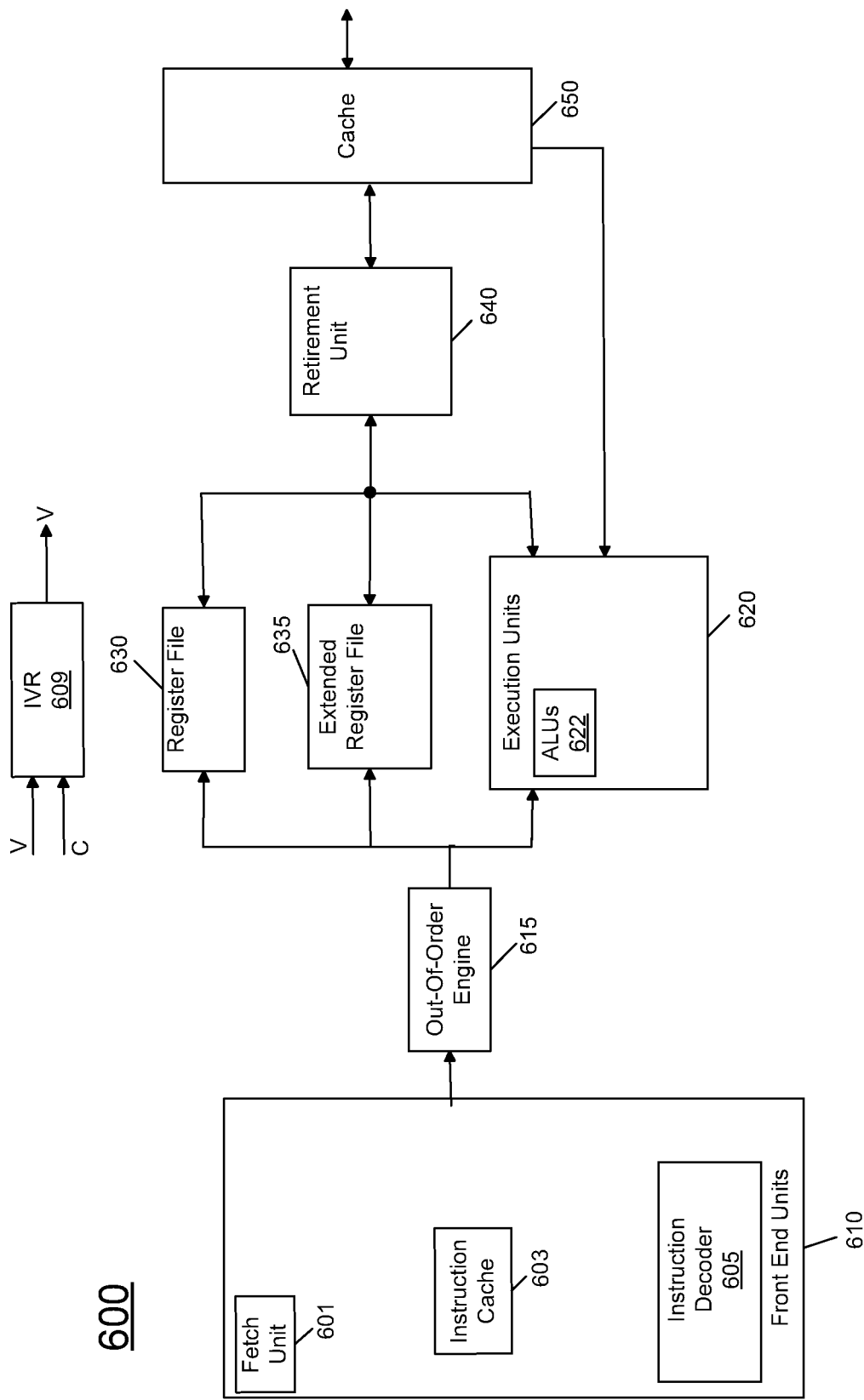
FIG. 5 is a block diagram of a processor core in accordance with one embodiment of the present invention.

Referring now to FIG. 5, shown is a block diagram of a processor core in accordance with one embodiment of the present invention. As shown in FIG. 5, processor core 600 may be a multi-stage pipelined out-of-order processor. Core 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including core 600 may be a general-purpose processor, such as a Core™ i3, i5, i7, 2 Duo and Quad, Xeon™, Itanium™, XScale™ or StrongARM™ processor, which are available from Intel Corporation. Alternatively, the processor may be from another company, such as a design from ARM Holdings, Ltd, MIPS, etc. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

As shown in FIG. 5, core 600 may operate at various voltages and frequencies as a result of integrated voltage regulator 609. As seen in FIG. 5, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to a retirement unit 640 including a reorder buffer (ROB). This ROB may include various arrays and logic to receive information associated with instructions that are executed. This information is then examined by retirement unit 640 to determine whether the instructions can be validly retired and result data committed to the architectural state of the processor, or whether one or more exceptions occurred that prevent a proper retirement of the instructions. Of course, retirement unit 640 may handle other operations associated with retirement.

As shown in FIG. 5, retirement unit 640 is coupled to a cache 650 which in one embodiment may be a low level cache (e.g., an L1 cache), although the scope of the present invention is not limited in this regard. Also, execution units 620 can be directly coupled to cache 650. From cache 650, data communication may occur with higher level caches, system memory and so forth. More specifically, in a tile-based multicore processor, core 600 and low level cache 650 may couple in turn to a MLC and an LLC of the tile, as described herein. Furthermore, when core 600 is to enter a low power state and/or when low level cache 650 and/or the MLC has sufficient capacity to handle a workload executing on the core, the associated LLC of the tile may be power gated as described herein.

While shown with this high level in the embodiment of FIG. 5, understand the scope of the present invention is not limited in this regard. For example, while the implementation of FIG. 5 is with regard to an out-of-order machine such as of a ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
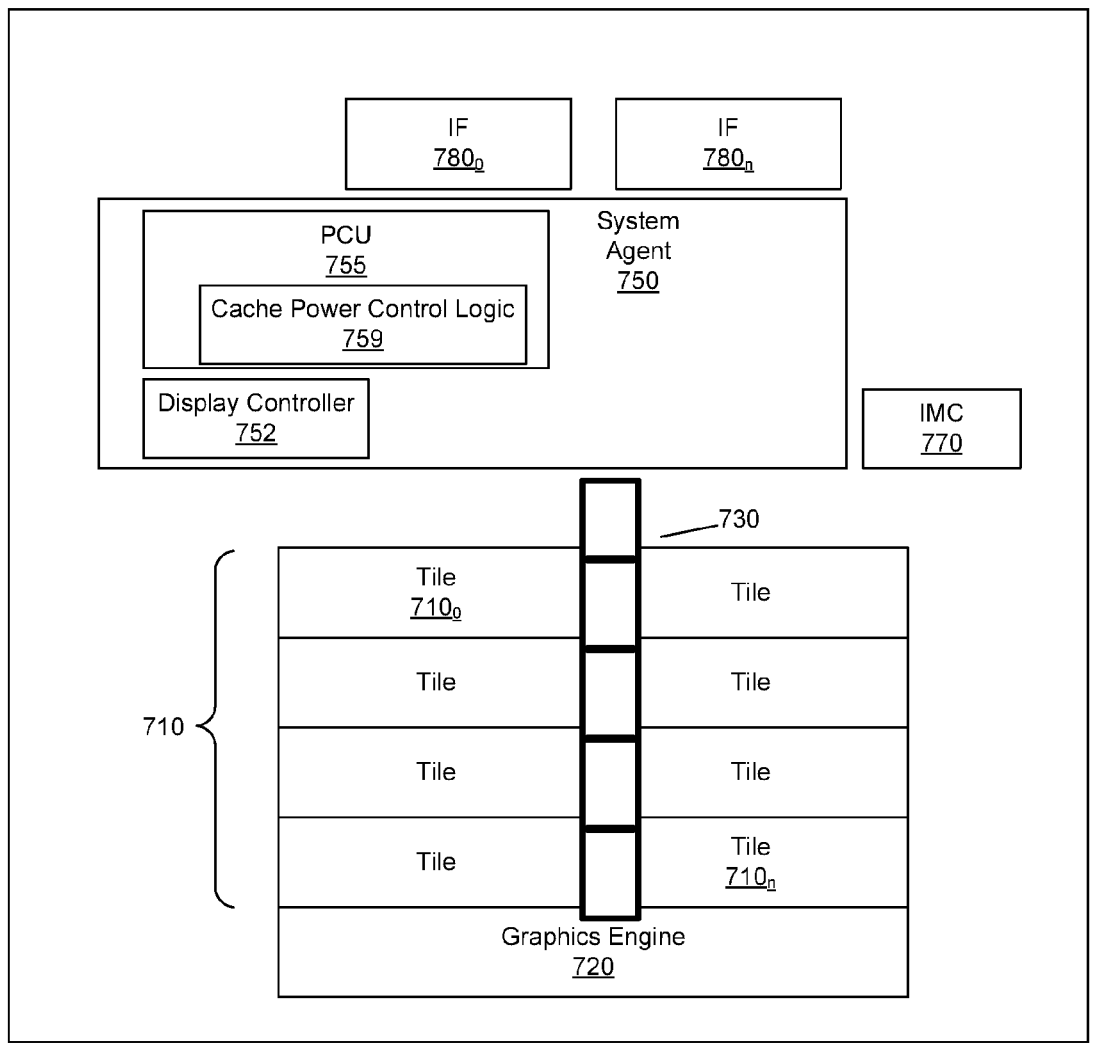
FIG. 6 is a block diagram of a multicore processor in accordance with an embodiment of the present invention.

Referring now to FIG. 6, shown is a block diagram of a multicore processor in accordance with an embodiment of the present invention. As shown in the embodiment of FIG. 6, processor 700 includes multiple domains. Specifically, a core domain 710 can include a plurality of tiles $710_0$-$710_n$, a graphics domain 720 can include one or more graphics engines, and a system agent domain 750 may further be present. In various embodiments, system agent domain 750 may handle power control events and power management such that individual units of domains 710 and 720 such as cores and/or graphics engines can be controlled to independently dynamically operate at an appropriate turbo mode frequency in light of the activity (or inactivity) occurring in the given unit. Each of domains 710 and 720 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each tile 710 may include a private cache hierarchy including two or more cache levels in addition to various execution units and additional processing elements. In turn, the various tiles may be coupled to each other a ring interconnect 730, which further provides interconnection between the cores, graphics domain 720 and system agent circuitry 750. In one embodiment, interconnect 730 can be part of the core domain. However in other embodiments the ring interconnect can be of its own domain.

As further seen, system agent domain 750 may include display controller 752 which may provide control of and an interface to an associated display. As further seen, system agent domain 750 may include a power control unit 755. As shown in FIG. 6, PCU 755 may include a cache power control logic 759 in accordance with an embodiment of the present invention. Based on various information received from associated tiles 710 as well as low power state decisions made within PCU 755, control logic 759 may cause an LLC or other portion of the private cache hierarchy of one or more of the tiles to be power gated to reduce power consumption when the cache slice is not needed for execution of a current workload and/or when the associated core of the tile is entering a low power state. However, at least one other tile may remain fully powered, including its LLC as a result of the private cache hierarchy present in multicore processor 700. As such, the need to maintain powered on an entirety of an LLC formed of different private cache slices can be avoided, increasing power saving opportunities.

As further seen in FIG. 6, processor 700 can further include an integrated memory controller (IMC) 770 that can provide for an interface to a system memory, such as a dynamic random access memory (DRAM). Multiple interfaces $780_0$-$780_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
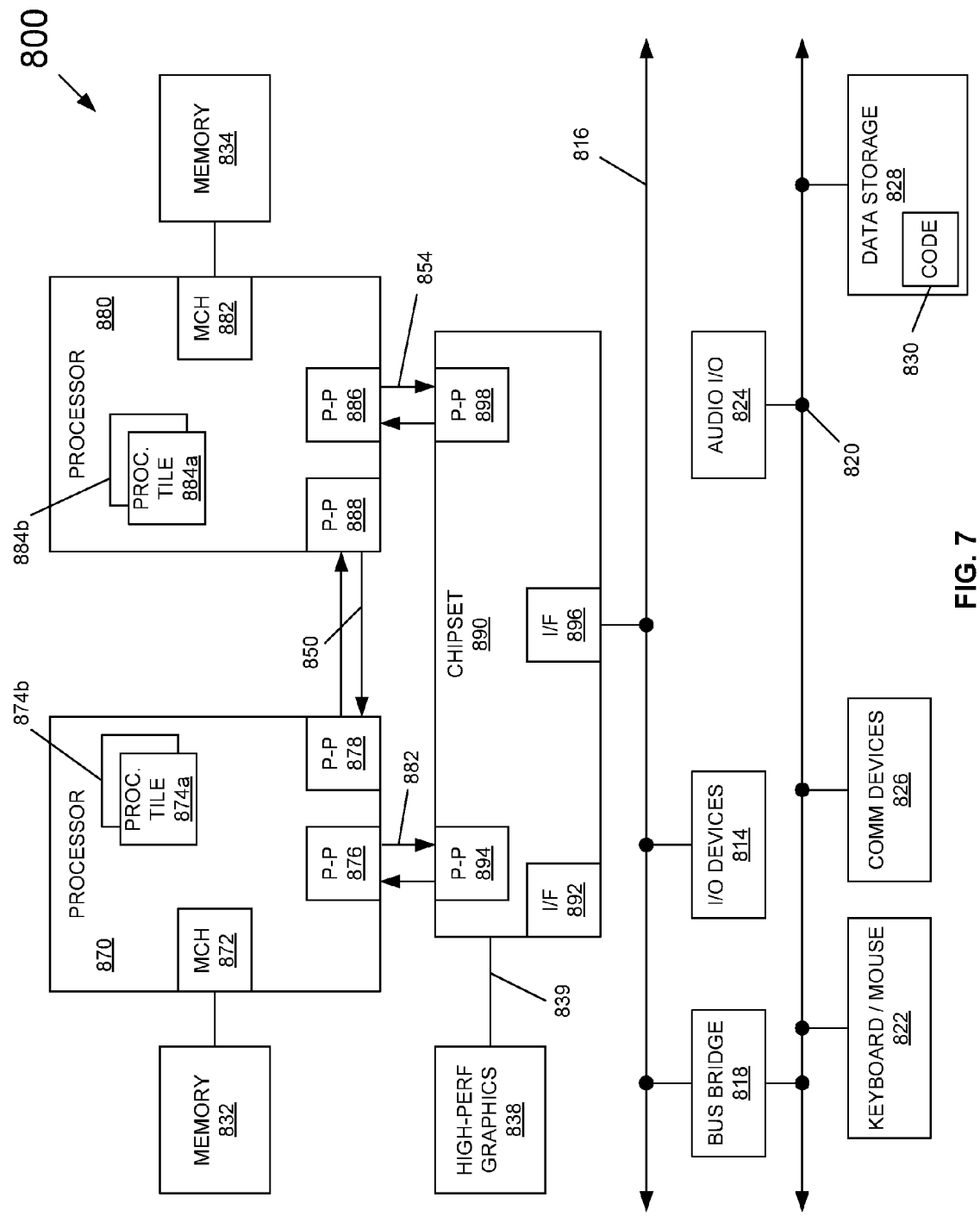
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 800 is a point-to-point interconnect system, and includes a first processor 870 and a second processor 880 coupled via a point-to-point interconnect 850. As shown in FIG. 7, each of processors 870 and 880 may be multi-tile processors, including first and second processor tiles (i.e., processor tiles 874a and 874b and processor tiles 884a and 884b), although potentially many more tiles may be present in the processors. Each of the processor tiles can include a core and a private cache hierarchy, in which one or more levels of the private cache hierarchy may be power gated independently of the remainder of the tile, as well as independently of other tiles of the multi-tile processor.

Still referring to FIG. 7, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 7, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 852 and 854, respectively. As shown in FIG. 7, chipset 890 includes P-P interfaces 894 and 898.

Furthermore, chipset 890 includes an interface 892 to couple chipset 890 with a high performance graphics engine 838, by a P-P interconnect 839. In turn, chipset 890 may be coupled to a first bus 816 via an interface 896. As shown in FIG. 7, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Embodiments can be incorporated into other types of systems including mobile devices such as a smart cellular telephone, tablet computer, netbook, Ultrabook™, or so forth.

Using an adaptive local LLC and associated power management as described herein, significant power savings may be realized, especially when per core utilization is low (e.g. less than approximately 30%), which is relatively common for certain workloads such as server-based workloads. Using an embodiment of the present invention having private cache organization and dynamic LLC power management, power consumption can be reduced by ~50% with 10% loadline, and ~40% with 20% loadline. In a multicore processor having a private or clustered cache organization, maximum processor cache power saving opportunities can be realized while maintaining performance requirements by flushing and powering off local LLC portions when appropriate, based on run-time conditions.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of tiles, each tile including a core and a tile cache hierarchy, each core including a decoder to decode instructions, at least one execution unit to execute the decoded instructions, and a retirement unit to retire executed instructions, the tile cache hierarchy including a first level cache and a second level cache, wherein each of the first level cache and the second level cache is physically private to the tile; and
a controller coupled to the plurality of tiles, the controller including a cache power control logic to receive utilization information regarding the core and the tile cache hierarchy of a first tile and to cause the second level cache of the first tile to be independently power gated when a miss rate of the first level cache is less than a first threshold, based at least in part on the utilization information.

2. The processor of claim 1, wherein the cache power control logic is to independently power gate the second level cache while the core is in an active state.

3. The processor of claim 1, wherein the cache power control logic is to cause the second level cache to be power gated while the core is in a low power state and a core of at least another of the plurality of tiles is in an active state.

4. The processor of claim 1, wherein the cache power control logic is to determine an energy break even value and to cause the second level cache to be power gated when an estimated idle duration for the core is greater than the energy break even value.

5. The processor of claim 4, wherein the cache power control logic is to calculate the energy break even value using static values and dynamic values associated with the processor.

6. The processor of claim 4, wherein the cache power control logic is to prevent the second level cache from being power gated when the estimated idle duration is greater than the energy break even value, based on quality of service (QoS) information associated with a workload being executed on the processor.

7. The processor of claim 1, wherein when the second level cache is power gated, the first level cache is to issue a read request to a system memory responsive to a miss in the first level cache.

8. The processor of claim 1, wherein at least a portion of information stored in the second level cache is to be flushed to a different second level cache of a different one of the plurality of tiles before the second level cache is power gated.

9. A method comprising:
determining an estimated idle duration for a core of a multicore processor, the core associated with a private cache hierarchy including a first level cache, a mid-level cache (MLC) and a last level cache (LLC);
determining a time value for a break even condition, wherein the break even condition is a minimum amount of time for the LLC to be in a low power state;
receiving performance metric information from the private cache hierarchy;
comparing the performance metric information to a threshold value; and
power gating the LLC when the estimated idle duration is greater than the time value, while at least one other core of the multicore processor associated with another private cache hierarchy remains in an active state.

10. The method of claim 9, further comprising power gating the LLC based on the comparison of the performance metric information to the threshold value.

11. The method of claim 9, wherein the performance metric information comprises a miss rate of the MLC and power gating the LLC when the miss rate is less than the threshold value.

12. The method of claim 9, further comprising determining the estimated idle duration based at least in part on an idle duration report received from a device coupled to the multicore processor.

13. The method of claim 9, further comprising determining the time value for a first workload and storing the time value in a storage of the multicore processor.

14. The method of claim 13, further comprising determining a second time value for a break even condition associated with a second workload, and using the second time value to determine whether to power gate the LLC during execution of the second workload on the multicore processor.

15. An apparatus comprising:
a multicore processor having a plurality of tiles, each tile including a core and a tile cache hierarchy, the tile cache hierarchy including a first cache, a second cache and a third cache, wherein each of the first cache, the second cache and the third cache are private to the tile, and a cache power control logic is to receive performance metric information regarding the tile cache hierarchy of a first tile of the plurality of tiles and to cause the third cache of the first tile to be power gated when a miss rate of the second cache is less than a first threshold based at least in part on the performance metric information, while the core, the first cache and the second cache of the first tile remain in an active state.

16. The apparatus of claim 15, wherein the cache power control logic is to determine an energy break even value and to cause the third cache to be power gated when the energy break even value is less than an estimated idle duration for the core of the first tile.

17. The apparatus of claim 16, wherein the cache power control logic is to prevent the third cache from being power gated when the energy break even value is less than the estimated idle duration, based on quality of service (QoS) information associated with a workload being executed on the core of the first tile.

* * * * *